Figure 1:
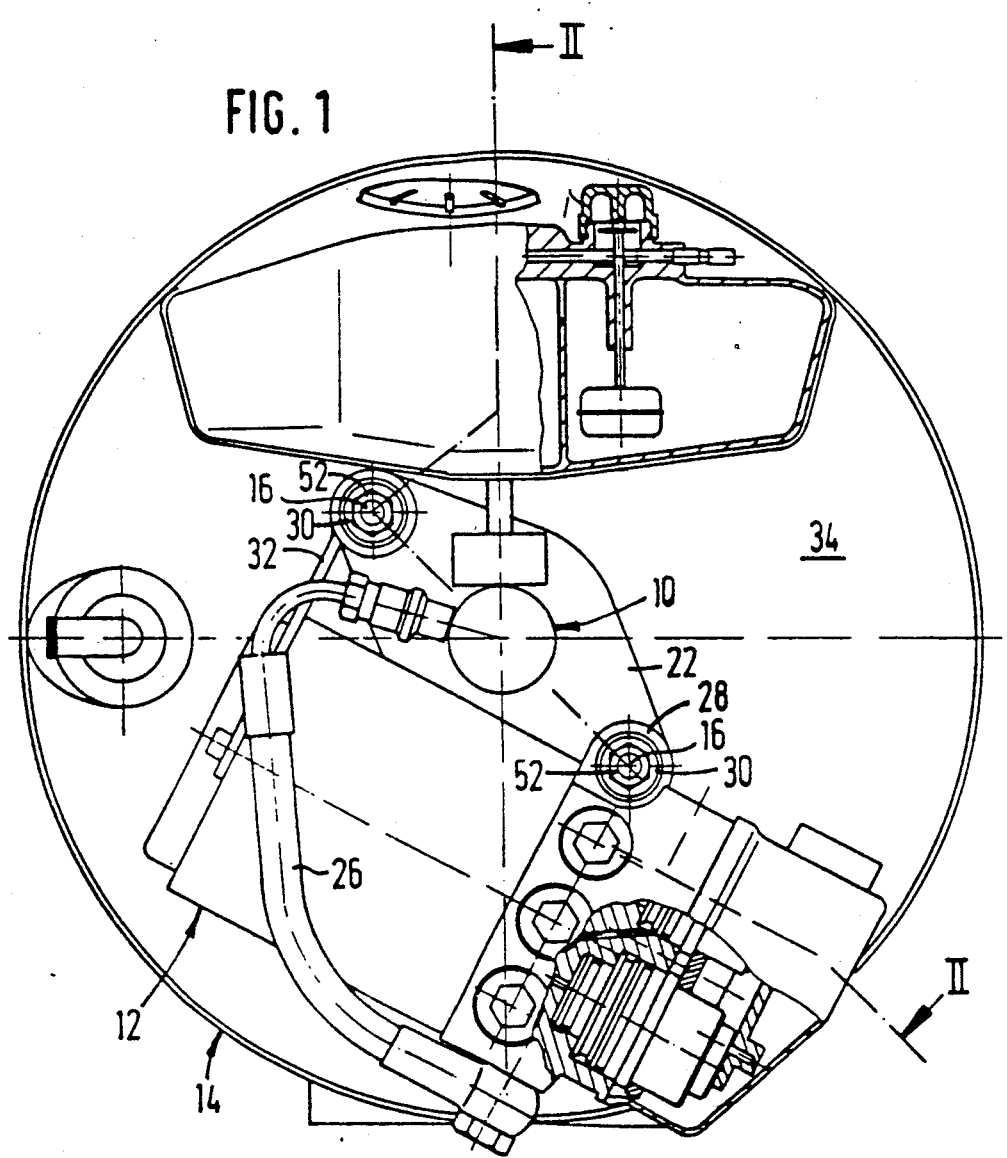

United States Patent [19]

Heibel et al.

[11] Patent Number: 5,072,996
[45] Date of Patent: Dec. 17, 1991

[54] BRAKE ACTUATING ASSEMBLY FOR MOTOR VEHICLES

[75] Inventors: Helmut Heibel, Moschheim; Leo Gilles, Koblenz, both of Fed. Rep. of Germany

[73] Assignee: Lucas Industries public limited company, Birmingham, England

[21] Appl. No.: 469,603
[22] PCT Filed: Aug. 17, 1989
[86] PCT No.: PCT/EP89/00971
 § 371 Date: Mar. 27, 1990
 § 102(e) Date: Mar. 27, 1990
[87] PCT Pub. No.: WO90/02065
 PCT Pub. Date: Mar. 8, 1990

[30] Foreign Application Priority Data

Aug. 19, 1988 [DE] Fed. Rep. of Germany ....... 8810531

[51] Int. Cl.⁵ .................. B60T 13/567; B60T 8/44
[52] U.S. Cl. .................. 303/114; 60/547.1; 60/591; 92/169.3
[58] Field of Search .................. 303/2, 3, 7, 112, 113, 303/115, 116, 119, 114; 92/161, 169.2, 169.3; 91/369.1, 369.2, 369.3, 369.4; 60/547.1, 591; 188/356, 357

[56] References Cited

U.S. PATENT DOCUMENTS

| | | | |
|---|---|---|---|
| 3,727,993 | 4/1973 | Schenk | 303/115 |
| 3,752,536 | 8/1973 | Macheu | 303/115 |
| 4,339,921 | 7/1982 | Schanz | 60/547.1 |
| 4,377,069 | 3/1983 | Kobayashi | 92/161 X |
| 4,402,256 | 9/1983 | Ando | 92/169.3 |
| 4,594,854 | 6/1986 | Takeuchi et al. | 60/547.1 |
| 4,827,720 | 5/1989 | Flynn et al. | 60/547.1 |
| 4,828,337 | 6/1983 | Wagner et al. | 303/112 |

FOREIGN PATENT DOCUMENTS

| | | | |
|---|---|---|---|
| 2025549 | 1/1980 | United Kingdom | 92/169.3 |
| 2087496 | 5/1982 | United Kingdom | 92/169.3 |
| 2188995 | 10/1987 | United Kingdom | 303/114 |

Primary Examiner—Robert J. Oberleitner
Assistant Examiner—Alfred Muratori
Attorney, Agent, or Firm—Oblon, Spivak, McClelland, Maier & Neustadt

[57] ABSTRACT

The assembly includes a master brake cylinder (10) to which at least one brake circuit can be connected, a modulator (12) and a pneumatic braking force booster (14). For modulating the pressure in the brake circuit the modulator (12) is connected to the master brake cylinder (10). The braking force booster (14) comprises a housing (34, 36) having at least one partition (38) movable in piston-like manner. For transmitting reaction forces of the master brake cylinder (10) to a vehicle wall (20) at least one connecting pin (16, 18) extends through the housing (34, 36) of the braking force booster (14). The modulator (12) is likewise mounted with bypassing of the master brake cylinder (10) on at least one connecting pin (16, 18) which extends through the housing (34, 36) of the braking force booster (14). This avoids vibrations generated by the modulator (12) being transmitted directly to the master brake cylinder (10) and possibly damaging the latter in the course of time.

6 Claims, 6 Drawing Sheets

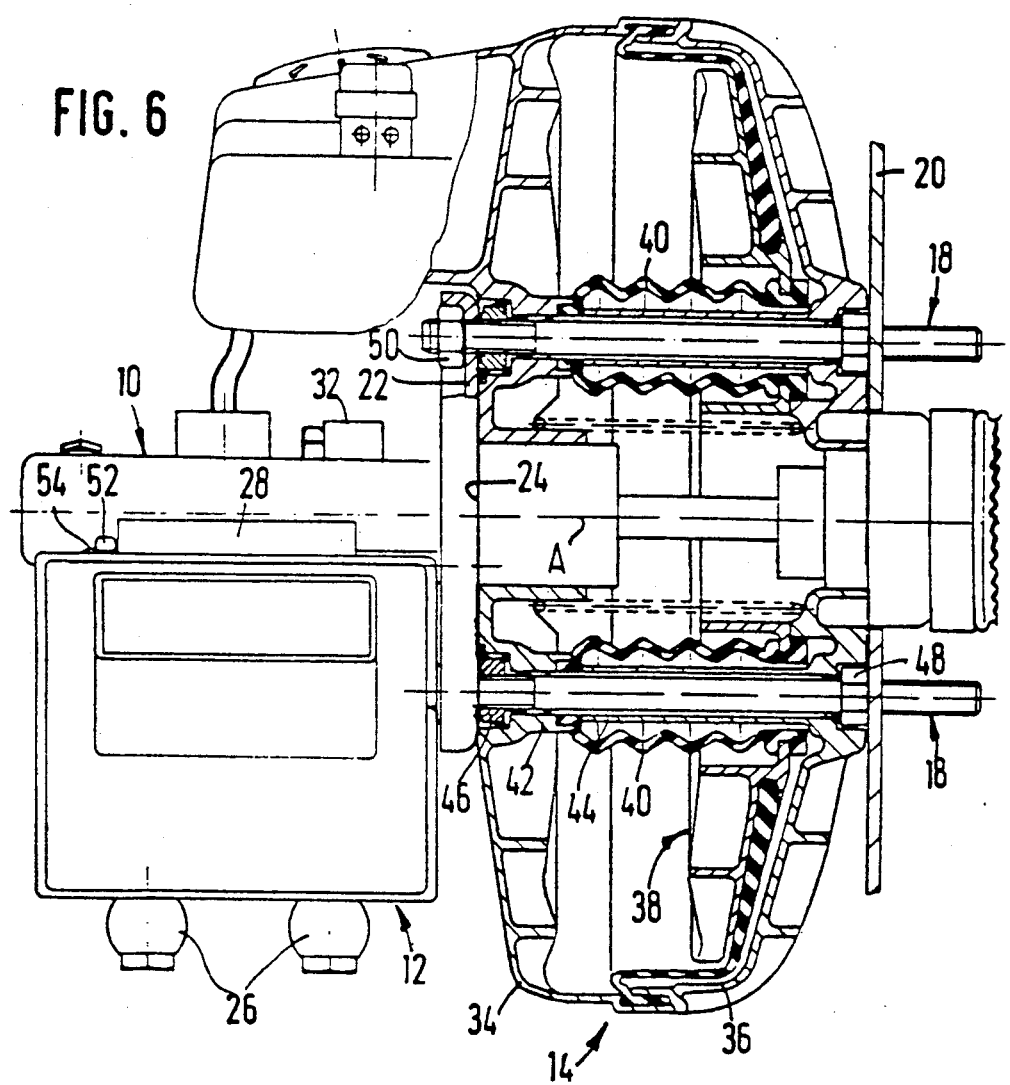

BRAKE ACTUATING ASSEMBLY FOR MOTOR VEHICLES

The invention relates to a brake actuating assembly for motor vehicles comprising
- a master brake cylinder to which at least one brake circuit is connectable,
- a modulator which is connected to the master brake cylinder to modulate the pressure in the brake circuit,
- a pneumatic braking force booster which comprises a housing having at least one partition movable in piston-like manner and
- at least one connecting pin which extends through the housing of the braking force booster for transmitting reaction forces of the master brake cylinder to a vehicle wall and the intermediate wall of the braking force booster.

DE 2845794 A1 discloses a braking force booster in various constructions which in the manner described above is combined by means of a connecting pin with a master brake cylinder to form a brake actuating assembly. Such an assembly has also already been supplemented by a modulator which for modulating the pressure in at least one brake circuit has been connected to the master brake cylinder. The modulator has also been secured mechanically to the master brake cylinder.

DE 3611045 A1 further discloses a brake actuating assembly in which a hydraulic high-pressure braking force booster and a modulator are mounted on a common flange which is configured for securing to the splashboard of a vehicle. Mounted on an end plate of the braking force booster remote from said flange is a master brake cylinder having four wheel brake cylinder connections. Secured to each of said connections is an electromagnetic valve controlled by the modulator having a screw-in thread for this purpose.

Common to both the brake actuating assemblies described above is that the mechanical and hydraulic connection between the master brake cylinder and at least one of the valves associated with the modulator is simple to establish and when necessary also simple to release again. The additional loading of the master brake cylinder by a modulator connected thereto also appeared acceptable in brake actuating assemblies of the type described at the beginning because the master brake cylinder is in turn secured via the connecting bolts or pins reliably to a vehicle wall without appreciably subjecting the braking force booster itself to a load.

In assemblies of the type corresponding to the preamble which are made in large series production however in operation in some cases damage to the master brake cylinder has been observed which could not be explained by the mechanical and hydraulic loads to be expected and for this reason material or machining faults were suspected. With such damage, there is fundamentally the danger that it will not be noticed for a long time and suddenly lead to complete failure of the master brake cylinder.

The invention is based on the problem of considerably reducing, if not completely excluding, the danger that under certain construction, material and production conditions leakage occurs at the master brake cylinder.

This problem is solved according to the invention in a brake actuating assembly of the type described at the beginning in that the modulator is likewise mounted with bypassing of the master brake cylinder on at least one connecting pin which extends through the housing of the braking force booster.

This achieves a mechanical separation of modulator and master brake cylinder; the necessary connection lines between the two are adequately yieldable so that they can transmit only negligibly small mechanical forces.

The invention is based on the recognition that the previously only very rarely occurring damage, nevertheless very serious because of their possibly grave consequences, to master brake cylinders of brake actuating assemblies according to the preamble are due to the fact that the modulator valves opening and closing in rapid succession when the modulator becomes active generate vibrations in a modulator connected mechanically to said mater cylinder which can superimpose themselves on vehicle vibrations and other factors loading the master brake cylinder, in particular the hydraulic pressures obtaining therein, in such an unfavourable manner that in the cylinder wall of the master brake cylinder a crack arises which sooner or later can result in a leak.

In the brake actuating assembly according to the invention, due to the mounting of the modulator separate from the master brake cylinder vibrations originating from the modulator valves are not transmitted to the master brake cylinder or are transmitted only to a greatly reduced extent. Nevertheless, a close proximity can be maintained between the master brake cylinder and modulator as is fundamentally desired because of the restricted space available and in the interest of short connecting lines.

The invention can be configured in that the modulator and a flange carrying the master brake cylinder are mounted on at least one common connecting pin which extends through the braking force booster and the flange.

In another embodiment of the invention the modulator is secured to a flange which also carries the master brake cylinder and is mounted on at least one connecting pin which extends through the braking force booster.

In each case it is expedient for the modulator to be mounted via at least one rubber spring element.

It is further advantageous for the securing of the modulator to be releasable with continuing securing of the master brake cylinder. This facilitates mounting and dismounting of the assembly.

Finally, it is advantageous for the modulator to be connected to the master brake cylinder solely with one or several curved pliable connecting lines. In this manner the master brake cylinder is kept free from every avoidable load.

Figure 2:
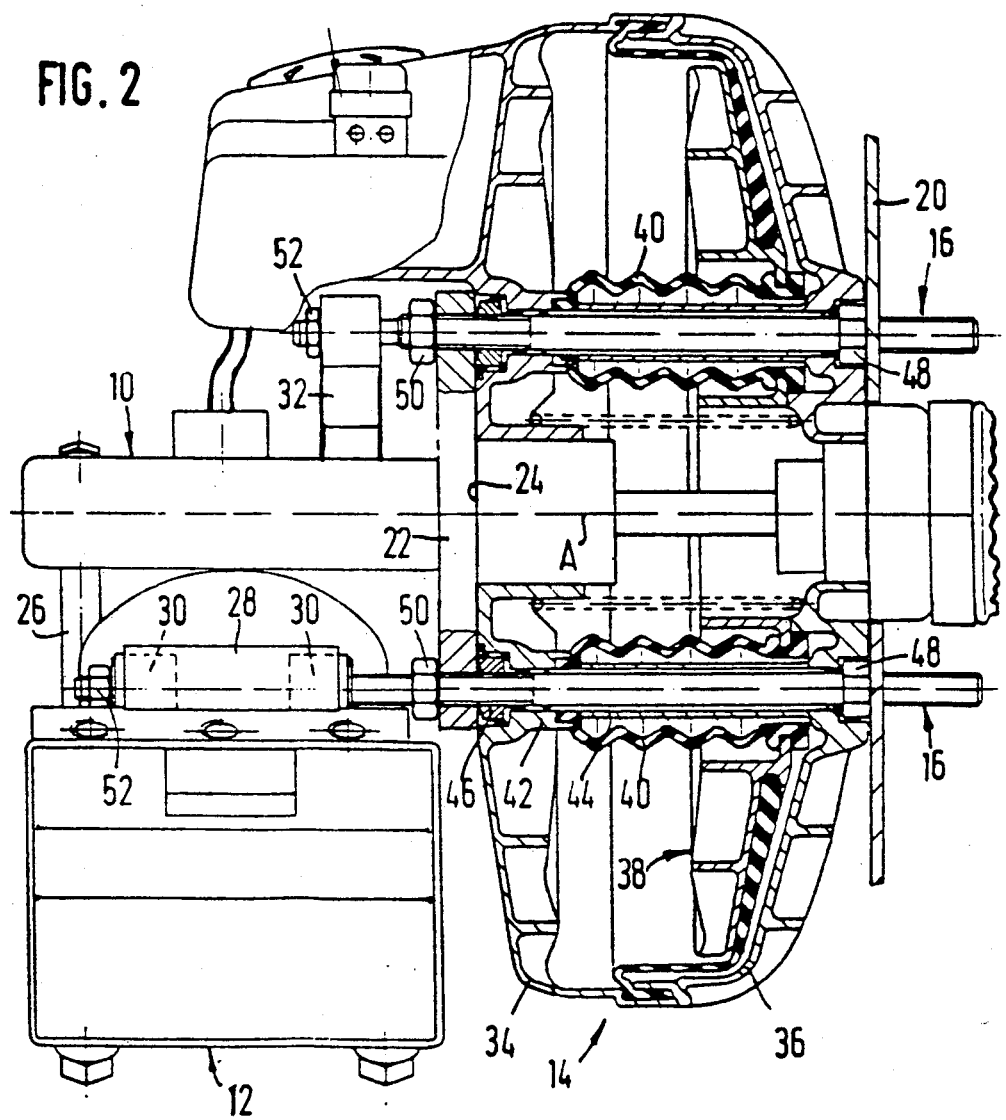
Figure 3:
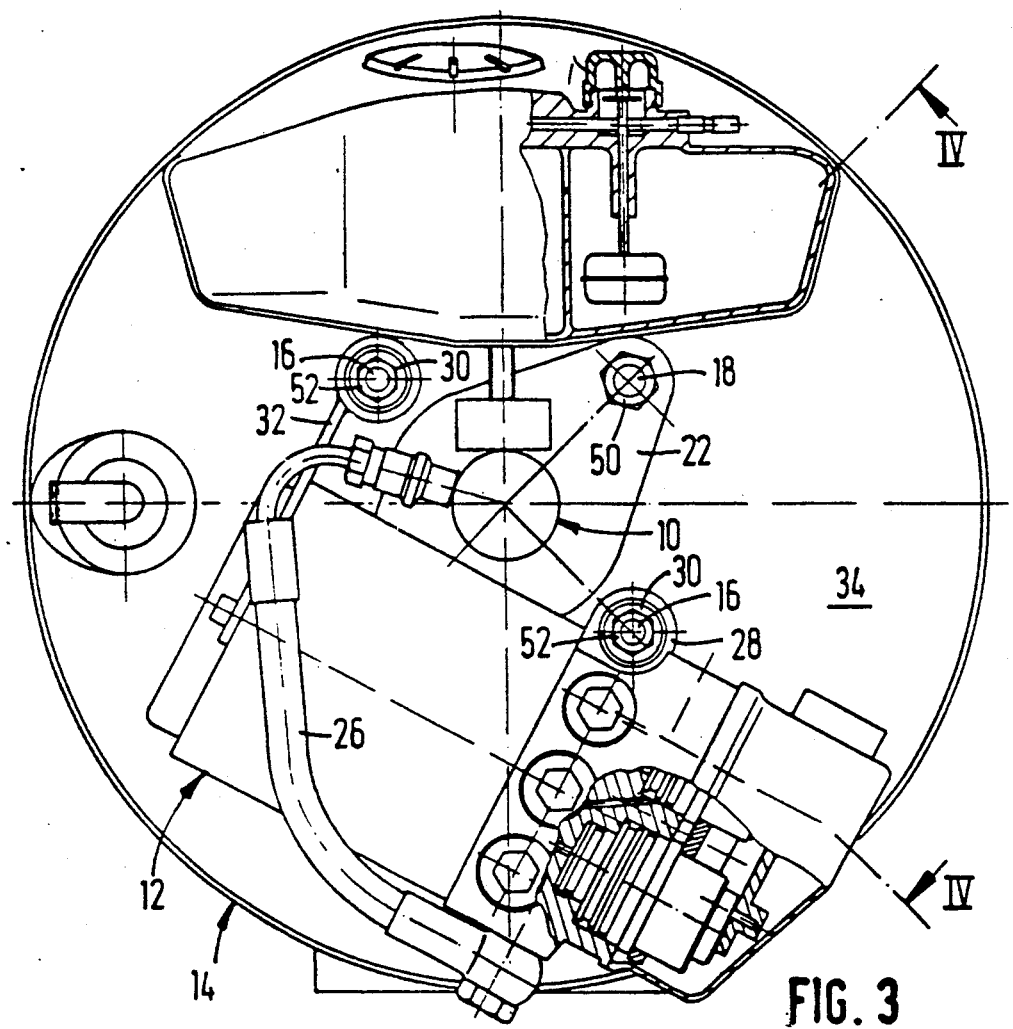
Figure 4:
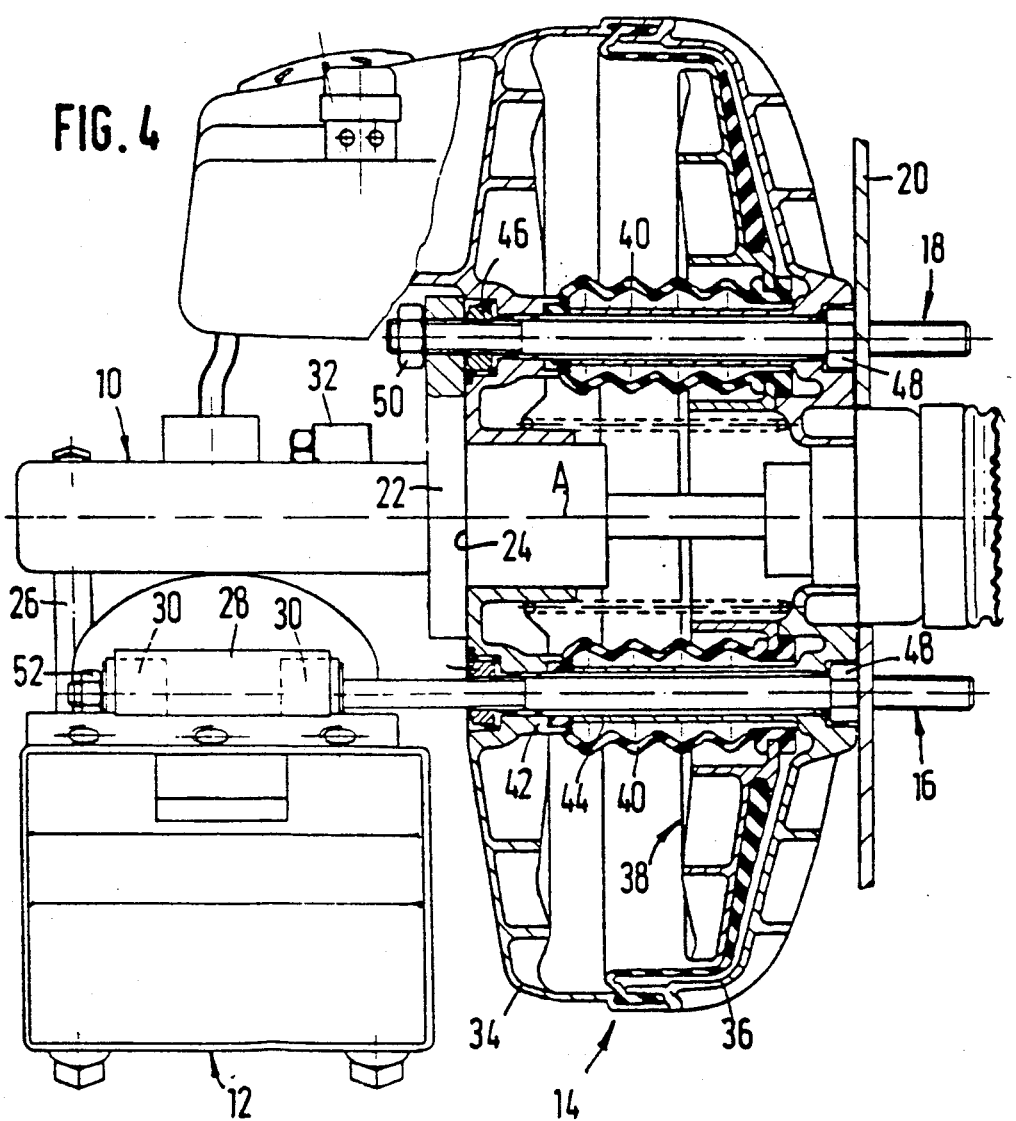
Figure 5:
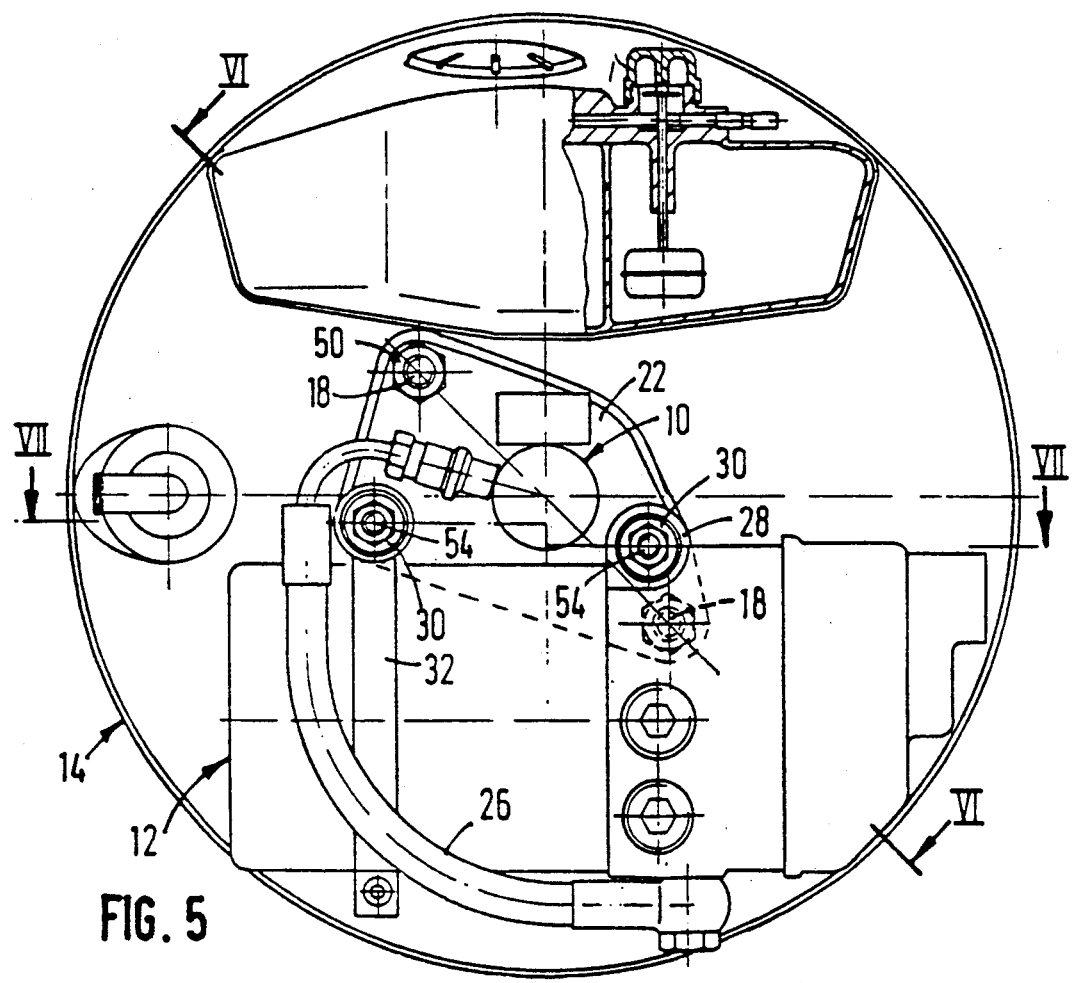
Figure 7:
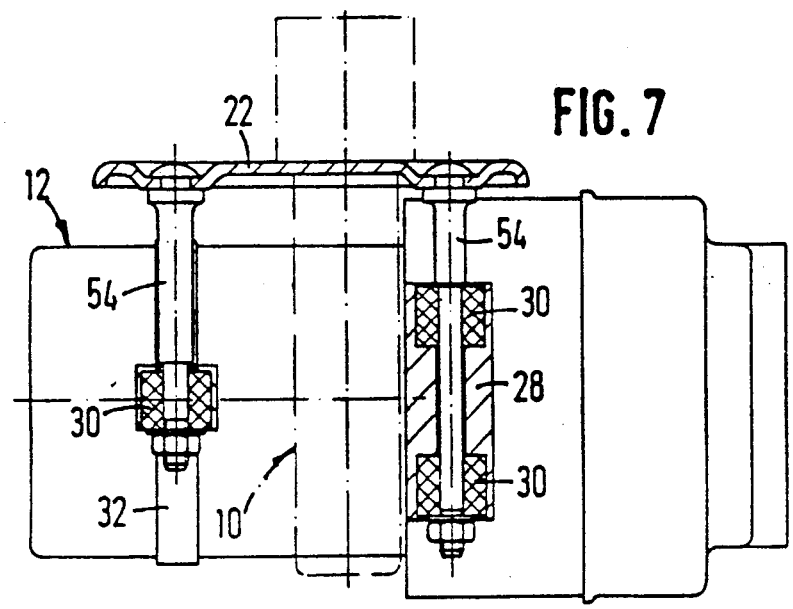

Examples of embodiment of the invention will be explained in further detail hereinafter with the aid of schematic drawings, wherein:

FIG. 1 shows the front view of a first brake actuating assembly according to the invention, FIG. 2 shows the axial section II—II of FIG. 1, FIG. 3 shows the front view of a second brake actuating assembly according to the invention, FIG. 4 shows the axial section IV—IV of FIG. 3, FIG. 5 shows the front view of a third brake actuating assembly according to the invention, FIG. 6 shows the axial section VI—VI of FIG. 5 and FIG. 7 shows the axial section VII—VII of FIG. 5.

In all the three examples of embodiment illustrated the brake actuating assembly includes a hydraulic master brake cylinder 10, a modulator 12, a braking force booster 14 and at least one pair of connecting pins 16 and/or 18. The connecting pins 16, 18 extend parallel to the axis A of the braking force booster 14 through the latter and serve to secure the entire assembly to a vehicle wall 20. The master brake cylinder 10 is arranged coaxially with the braking force booster 14, partially incorporated into the side thereof remote from the vehicle wall 20 and mounted in usual manner by means of a flange 22 which bears on a shoulder 24 of the master brake cylinder 10.

In all the three examples illustrated the flange 22 is a plate-like component made separately from the braking force booster 14, that is according to FIGS. 1 and 2 and FIGS. 3 and 4 a casting or forged part, according to FIGS. 5 to 7 however a part stamped from sheet metal, and is pushed onto the portion of the master brake cylinder 10 which projects out of the braking force booster 14 forwardly, that is to the left in FIGS. 2, 4 and 6, and has a smaller diameter than the portion of the master brake cylinder 10 engaging into the braking force booster 14. The flange 22 may also be welded to or made integrally with the master brake cylinder 10. In every case the flange 22 is to be considered not as part of the master brake cylinder 10 but as separate component in the sense that forces loading the modulator 12 and possibly carried away from the latter via the flange 22 do not also subject the master brake cylinder 10 to a load.

The modulator 12 is connected to the master brake cylinder 10 by a curved connecting line 26 which is pliable at least along a part of its length and is thereby, unable to transmit appreciable mechanical forces from the modulator 12 to the master brake cylinder 10. Formed on the modulator 12 is a sleeve-like mounting member 28 which contains a pair of rubber spring elements 30. Also secured to the modulator 12 is a stirrup member 32 which forms a constructional unit with a further rubber spring element 30.

In all the three embodiments illustrated the braking force booster 14 comprises a two-part housing 34, 36 made up of a front housing part 34 and a rear housing part 36, both of plastic. The interior of the housing 34, 36 is divided by a partition 38 which is movable in piston-like manner and at which on actuation of the brake a pressure difference obtains by which the master brake cylinder 10 is actuated in the usual manner which does not need to be explained. As also usual, the partition 38 is sealed by resilient sleeves 40 with respect to the tubular connection pieces 42 and 44 which are formed on the front housing part 34 and the rear housing part 36 respectively.

In the embodiment of a brake actuating assembly illustrated in FIGS. 1 and 2 only two connecting pins 16 are provided which both connect the flange 22 as well as the modulator 12 directly to the vehicle wall 20. The lower of said two connecting pins 16 extends through the sleeve-like mounting member 28 of the modulator 12 and through the rubber spring elements 30 contained therein; the upper connecting pin 16 however extends through the rubber spring element 30 enclosed by the stirrup member 32. The two housing parts 34 and 36 are held directly together by nuts 46 and 48 which bear in air-tight manner on said parts and are screwed onto the connecting pins 16 so that said parts cannot separate from each other even when the flange 22 has not yet been mounted. The flange 22 is not mounted until after installation of the master brake cylinder 10 and is secured by a further pair of nuts 50 screwed onto the connecting pins 16. The modulator 12 is secured with further nuts 52 on the connecting pins 16.

In the embodiment illustrated in FIGS. 3 and 4 two pairs of connecting pins 16 and 18 are provided which all extend axis-parallel through the braking force booster 14 and hold together the housing parts 34 and 36 thereof by means of nuts 46 and 48. In contrast to FIGS. 1 and 2 the two connecting pins 16 extend past the flange 22 but as in FIGS. 1 and 2 through the sleeve-like mounting member 28 or the stirrup member 32 including all the associated rubber spring elements 30. The two connecting pins 18 extend however, identical in this respect to FIGS. 1 and 2, through the flange 22 but terminate just before the latter and do not serve to mount the modulator 12.

In the embodiment according to FIGS. 5 to 7 only one pair of connecting pins 18 is provided which terminate at the front side of the flange 22 and are not directly connected to the modulator 12. The modulator 12 is secured to the flange 22 by a pair of screws 54 extending through the sleeve-like mounting member 28 and the stirrup member 32 and the associated rubber spring elements 30, said flange 22 thereby carrying both the master brake cylinder 10 and the modulator 12.

We claim:

1. Brake actuating assembly for motor vehicles comprising
    a master brake cylinder (10) to which at least one brake circuit is connectable,
    a modulator (12) having a fluid connection with said master brake cylinder (10) to modulate the pressure in the brake circuit,
    A pneumatic braking force booster (14) which comprises a housing (34, 36) having at least one partition (38) movable in piston-like manner and
    at least one connecting pin (16, 18) which passes through the housing (34, 36) of the braking force booster (14) for transmitting reaction forces of the master brake cylinder (10) to a vehicle wall (20), characterized in that the modulator (12) is mounted out of direct contact with said master brake cylinder (10) on said at least one connecting pin (16, 18) which passes through the housing (34, 36) of the braking force booster (14) and is connected to said vehicle wall.

2. Assembly according to claim 1, including a flange (22) carrying said master brake cylinder (10) characterized in that said modulator (12) and said flange (22) are commonly mounted on said at least one connecting pin (16, 18) which passes through the braking force booster (14) and through said flange (22).

3. Assembly according to claim 1, including a flange (22) carrying said master brake cylinder (10) characterized in that the modulator (12) is also secured to said flange (22) separately from said master brake cylinder (10), said flange (22) being mounted on said at least one connecting pin (16, 18) which passes through said braking force booster (14).

4. Assembly according to any one of claims 1 to 3, characterized in that said modulator (12) is mounted on said at least one pin (16) (18) by way of at least one rubber spring element (30).

5. Assembly according to any one of claims 1 to 3, characterized in that said modulator (12) is releasable from said at least one pin (16, 18) without releasing the master brake cylinder (10).

6. Assembly according to any one of claims 1 to 3, characterized in that the modulator (12) is connected to the master brake cylinder (10) only by at least one curved pliable fluid connecting line (26).

* * * * *